(12) United States Patent
Murase et al.

(10) Patent No.: US 8,010,804 B2
(45) Date of Patent: Aug. 30, 2011

(54) METHOD TO PROTECT SECRETS AGAINST ENCRYPTED SECTION ATTACK

(75) Inventors: Masana Murase, Kawasaki (JP); Kanna Shimizu, Austin, TX (US); Wilfred Edmund Plouffe, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 12/188,600

(22) Filed: Aug. 8, 2008

(65) Prior Publication Data

US 2010/0037068 A1 Feb. 11, 2010

(51) Int. Cl.
  G06F 11/30 (2006.01)
  H04L 9/32 (2006.01)
  H04L 9/00 (2006.01)
(52) U.S. Cl. .......................... 713/190; 713/171; 380/45
(58) Field of Classification Search .................. 713/171, 713/190; 380/45, 277–278
See application file for complete search history.

(56) References Cited

U.S. PATENT DOCUMENTS
2002/0053024 A1* 5/2002 Hashimoto et al. ........... 713/168

OTHER PUBLICATIONS

Davis, Don "Defective Sign & Encrypt in S/MIME, PKCS#7, MOSS, PEM, PGP, and XML" Proceedings of the General Track: 2002 USENIX Annual Technical Conference, Year of Publication: 2001, ISBN:1-880446-09-X, pp. 65-78 (21 pages) www.world.std.com/~dtd/sign_encrypt/sign_encrypt7.html.
Zhang, Zhenfeng and Denggup Feng "Key Replacement Attack on a Certificateless Signature Scheme" Cryptology ePrint Archive, Report 2006/453 (5 Pages) eprint.iacr.org/2006/453.pdf.

* cited by examiner

*Primary Examiner* — Philip J Chea
(74) *Attorney, Agent, or Firm* — Hamilton & Terrile, LLP; Stephen A. Terrile (57) ABSTRACT

A method, system, and computer-usable medium are disclosed for controlling unauthorized access to encrypted application program code. Predetermined program code is encrypted with a first key. The hash value of an application verification certificate associated with a second key is calculated by performing a one-way hash function. Binding operations are then performed with the first key and the calculated hash value to generate a third key, which is a binding key. The binding key is encrypted with a fourth key to generate an encrypted binding key, which is then embedded in the application. The application is digitally signed with a fifth key to generate an encrypted and signed program code image. To decrypt the encrypted program code, the application verification key certificate is verified and in turn is used to verify the authenticity of the encrypted and signed program code image. The encrypted binding key is then decrypted with a sixth key to extract the binding key. The hash value of the application verification certificate associated with the second key is then calculated and used with the extracted binding key to extract the first key. The extracted first key is then used to decrypt the encrypted application code.

8 Claims, 9 Drawing Sheets

METHOD TO PROTECT SECRETS AGAINST ENCRYPTED SECTION ATTACK

BACKGROUND OF THE INVENTION

1. Field of the Invention

Embodiments of the disclosure relate in general to the field of computers and similar technologies, and in particular to software utilized in this field. Still more particularly, it relates to controlling unauthorized access to encrypted application program code.

2. Description of the Related Art

The use of cryptographic encryption and digital signatures to control user access to sensitive applications has become increasingly common in recent years. These applications may contain application secrets such as passwords and encryption keys, either in the application code itself or in associated data. As an example, a content protection key is typically embedded within a content protection application. To avoid unauthorized access to the content protection key by a malicious user, application programmers generally encrypt the content protection key before embedding it into the application image. As a further safeguard, decryption of the content protection key is intended to be limited to authorized users or trusted applications.

However, many approaches to encryption, and key management such as those found in the ISO/IEC JTC SC27, NIST FIPS Pub 196, and ANSI X9 series of security standards only address low-level implementation guidelines, such as how to securely select the size of a modulus. As such, they fail to provide guidance for higher-level design issues, such as how to securely combine encryption and authentication. As a result, naïve combinations of encryption and authentication often provide opportunities for attacks including forgery and the stealing of secrets. Even security protocols that address high-level design issues, such as Pretty Good Privacy (PGP) and S/MIME, fail to address sophisticated attacks such as an encrypted section replacement attack.

In such an attack, a malicious user copies encrypted application program code and its associated encrypted application encryption/decryption key from an encrypted application into a new application. Then, the malicious user signs the new application with their private signature key to generate a new digital signature. A digital certificate authenticating the malicious user's public signature verification key is then combined with the new digital signature, the copied encrypted section, and the copied encrypted application decryption/decryption key to generate a signed/encrypted application for the malicious user. An attempt is then made to decrypt the encrypted section. Since the digital certificate verifies that the malicious user's public signature verification key is authentic, the encrypted section is decrypted as if the malicious user was an authorized user. In view of the foregoing, there is a need for improved protection against an encrypted section replacement attack.

BRIEF SUMMARY OF THE INVENTION

The present invention includes, but is not limited to, a method, system, and computer-usable medium for controlling unauthorized access to encrypted application program code. In various embodiments, predetermined application program code is encrypted with a first key. In one embodiment, the first key comprises a private key. The hash value of an application verification certificate associated with a second key is then calculated by performing a one-way hash function. In one embodiment, the second key comprises a public signature verification key of an asymmetrical public key pair associated with an authorized user of the encrypted program code.

Binding operations are then performed with the first key and the calculated hash value to generate a third key, which is a binding key. The binding key is then encrypted with a fourth key to generate an encrypted binding key. In one embodiment, the fourth key comprises a public signature verification key of an asymmetrical public key pair associated with an application loader. In another embodiment, the application loader comprises a trusted entity operable to perform verifying and decrypting operations. The encrypted binding key is then embedded in the application. Once the encrypted binding key is embedded, the application is digitally signed with a fifth key to generate an encrypted and signed program code image. In one embodiment, the fifth key comprises a private signature key of an asymmetrical public key pair associated with an authorized user of the encrypted program code.

To decrypt the encrypted section, the application loader verifies the authenticity of the application verification key certificate. The verified application verification key certificate is then used to verify the authenticity of the encrypted and signed program code image. Then the encrypted binding key is decrypted with a sixth key to extract the binding key. In one embodiment, the sixth key comprises a private signature key of an asymmetrical public key pair associated with the application loader. The hash value of the application verification certificate associated with the second key is then calculated by performing a one-way hash function. The first key, which is the application encryption/decryption key, is then extracted using the extracted binding key and the calculated hash value. The extracted application encryption/decryption key is then used to decrypt the encrypted application code. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system, and computer-usable medium are disclosed for controlling unauthorized access to encrypted application program code. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
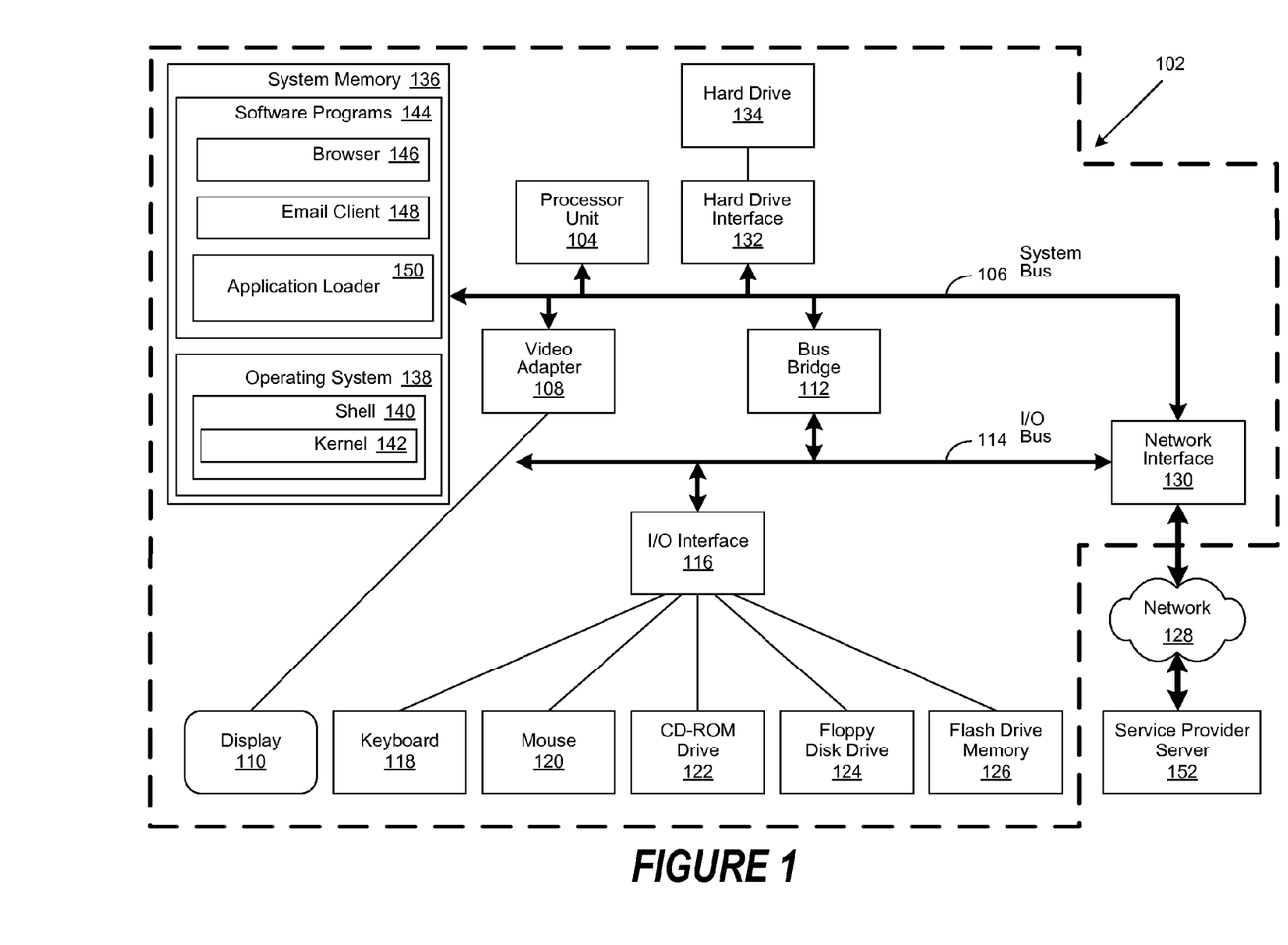
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy, and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include an application loader 150. The application loader 150 includes code for implementing the processes described in FIGS. 2 through 9 described herein below. In one embodiment, client computer 102 is able to download application loader 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
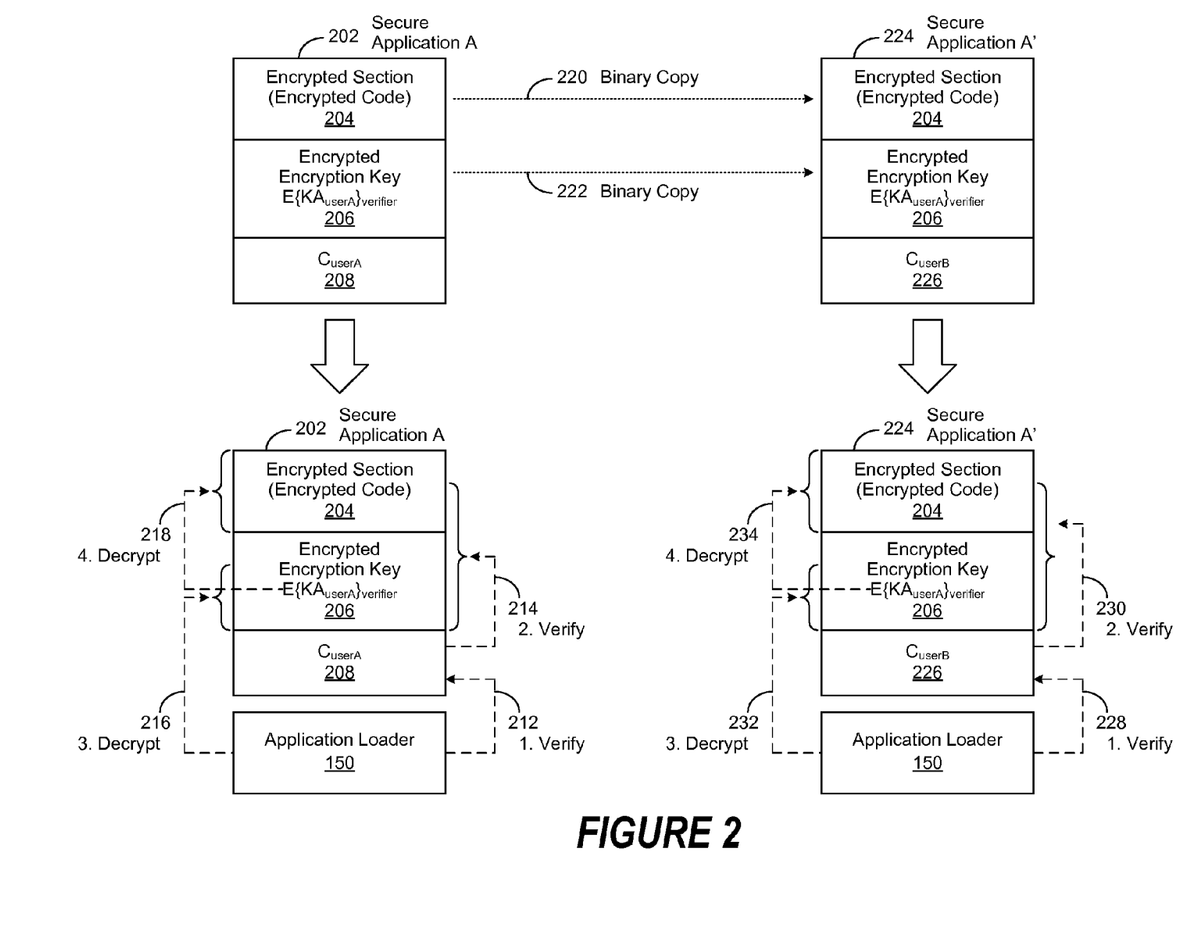
FIG. 2 is a simplified block diagram of verification and decryption operations performed by an application loader.

FIG. 2 is a simplified block diagram of verification and decryption operations performed by an application loader implemented in accordance with an embodiment of the invention. In this embodiment, Secure Application A 202 comprises an encrypted section 204, an encrypted encryption key 206, and a digital certificate $C_{UserA}$ 208. The encrypted section 204 comprises program code encrypted with an encryption/decryption key $KA_{userA}$. In turn, the encryption/decryption key $KA_{userA}$ 206 is encrypted with an encryption key associated with a Verifier to generate an encrypted encryption key 206 ($E\{KA_{UserA}\}_{Verifier}$). In various embodiments, the verifier comprises application loader 150. The digital certificate $C_{UserA}$ 208 is used by the verifier to verify the authenticity of Secure Application A 202.

In one embodiment, the verifier (e.g., application loader 150) first verifies 212 the digital certificate $C_{UserA}$ 208 with the Verifier's verification encryption key. The verifier then uses the digital certificate $C_{UserA}$ 208 to verify 214 the encrypted section 204 and encrypted encryption key 206 Secure Application A 202. Once the encrypted section 204 and encrypted encryption key 206 are verified, the verifier (e.g., application loader 150) decrypts 216 the encrypted encryption key 206 ($E\{KA_{UserA}\}_{Verifier}$) to extract the encryption/decryption key $KA_{UserA}$, which is then used to decrypt 218 the encrypted program code of the encrypted section 204.

However, it will be apparent to skilled practitioners of the art that Secure Application A 202 is vulnerable to an encryption section replacement attack despite the implementation of a verifier (e.g., application loader 150). As an example, a malicious person possessing an authorized user certificate $C_{UserB}$ 226 can gain access to the encrypted program code of the encrypted section 204 of Secure Application A 202. In one approach, the malicious person first makes a binary copy 220 of the encrypted section 204 of Secure Application A 202, followed by making a binary copy 222 of the encrypted encryption key 206 ($E\{KA_{UserA}\}_{Verifier}$). The two binary copies are then used to create a new application, Secure Application A' 224. The Secure Application A' 224 is then digitally signed with the authorized user certificate $C_{UserB'}$ 226, which is then attached to Secure Application A' 224. At run-time, the verifier (e.g., application loader 150) first verifies 228 $C_{UserB}$ 226 and then verifies 230 Secure Application A' 224 successfully. The encrypted encryption key 206 ($E\{KA_{UserA}\}_{Verifier}$) is then decrypted 232 and used to decrypt 234 the encrypted program code of the encrypted section 204 of Secure Application A' 224.

Figure 3:
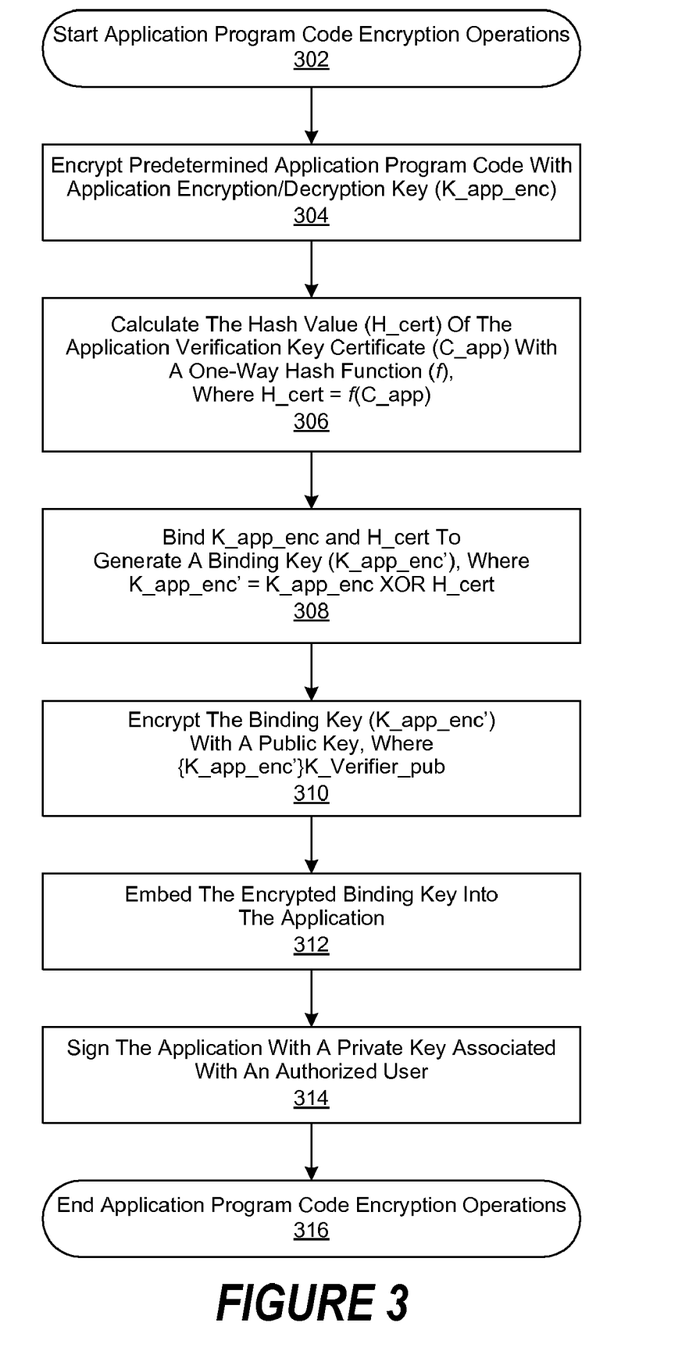
FIG. 3 is a generalized flowchart of application program code encryption operations.

FIG. 3 is a generalized flowchart of application program code encryption operations as implemented in accordance with an embodiment of the invention. In this embodiment, application encryption operations are begun in step 302, followed by the encryption of predetermined application program code in step 304 with a first key, which is application encryption/decryption key K_app_enc. In one embodiment, the first key comprises a private key. The hash value (H_cert) of an application verification certificate (C_app) associated with a second key is then calculated in step 306 by performing a one-way hash function ($f$), where H_cert=$f$(C_app). In one embodiment, the second key comprises a public signature verification key of an asymmetrical public key pair associated with an authorized user of the encrypted program code generated in step 304.

Binding operations are then performed in step 308 with the first key (K_app_enc) and the calculated hash value (H_cert) to generate a third key, which is binding key K_app_enc', where K_app_enc'=K_app_enc XOR H_cert. The third key (binding key K_app_enc') is then encrypted with a fourth key in step 310 to generate an encrypted binding key {K_app_enc'}K_Verifier_pub. In one embodiment, the fourth key comprises a public signature verification key of an asymmetrical public key pair associated with an application loader. In another embodiment, the application loader comprises a trusted entity operable to perform verifying and decrypting operations.

The encrypted third key is then embedded in the application in step 312. Once the encrypted third key is embedded, the application, which comprises the program code encrypted in step 304, is digitally signed with a fifth key to generate an encrypted and signed program code image. In one embodiment, the fifth key comprises a private signature key of an asymmetrical public key pair associated with an authorized user of the encrypted program code. Application encryption operations are then ended in step 316.

Figure 4:
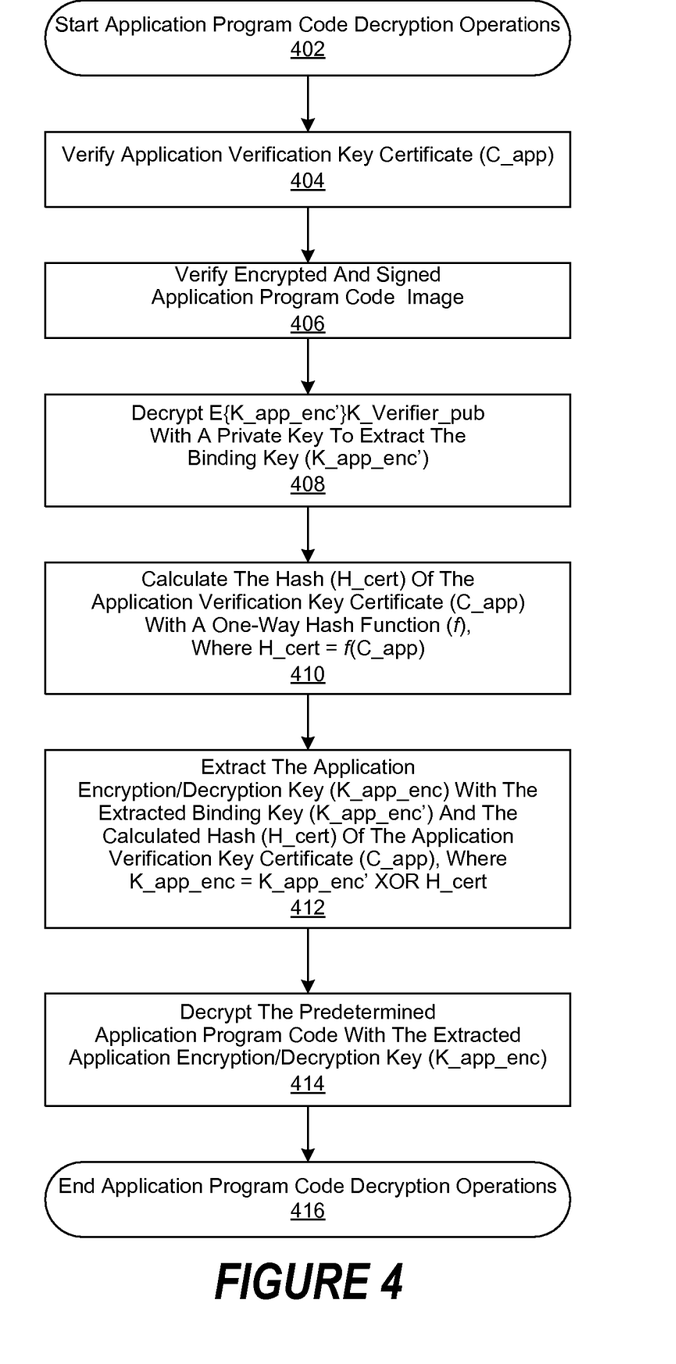
FIG. 4 is a generalized flowchart of application program code decryption operations.

FIG. 4 is a generalized flowchart of application program code decryption operations as implemented in accordance with an embodiment of the invention. In this embodiment, application decryption operations are begun in step 402, followed by verifying the authenticity of an application verification key certificate (C_app) in step 404. The verified application verification key certificate (C_app) is then used to verify the authenticity of the encrypted and signed program code image in step 406. In step 408, the encrypted binding key {K_app_enc'}K_Verifier_pub is decrypted with a sixth key to extract the third key (K_app_enc'). In one embodiment, the sixth key comprises a private signature key of an asymmetrical public key pair associated with an application loader. In another embodiment, the application loader comprises a trusted entity operable to perform verifying and decrypting operations.

The hash value (H_cert) of the application verification certificate (C_app) associated with a second key is then calculated in step 410 by performing a one-way hash function (ƒ) where H_cert=ƒ(C_app). In one embodiment, the second key comprises a public signature verification key of an asymmetrical public key pair associated with an authorized user of the encrypted program code generated in step 304 of FIG. 3. The first key, which is the application encryption/decryption key K_app_enc, is then extracted in step 412 using the extracted binding key K_app_enc' and the calculated hash value H_cert of the second key, where K_app_enc=K_app_enc' XOR H_cert. The extracted application encryption/decryption key K_app_enc is then used in step 414 to decrypt the encrypted application code generated in step 304 of FIG. 3. Application program code decryption operations are then ended in step 416.

Figure 5:
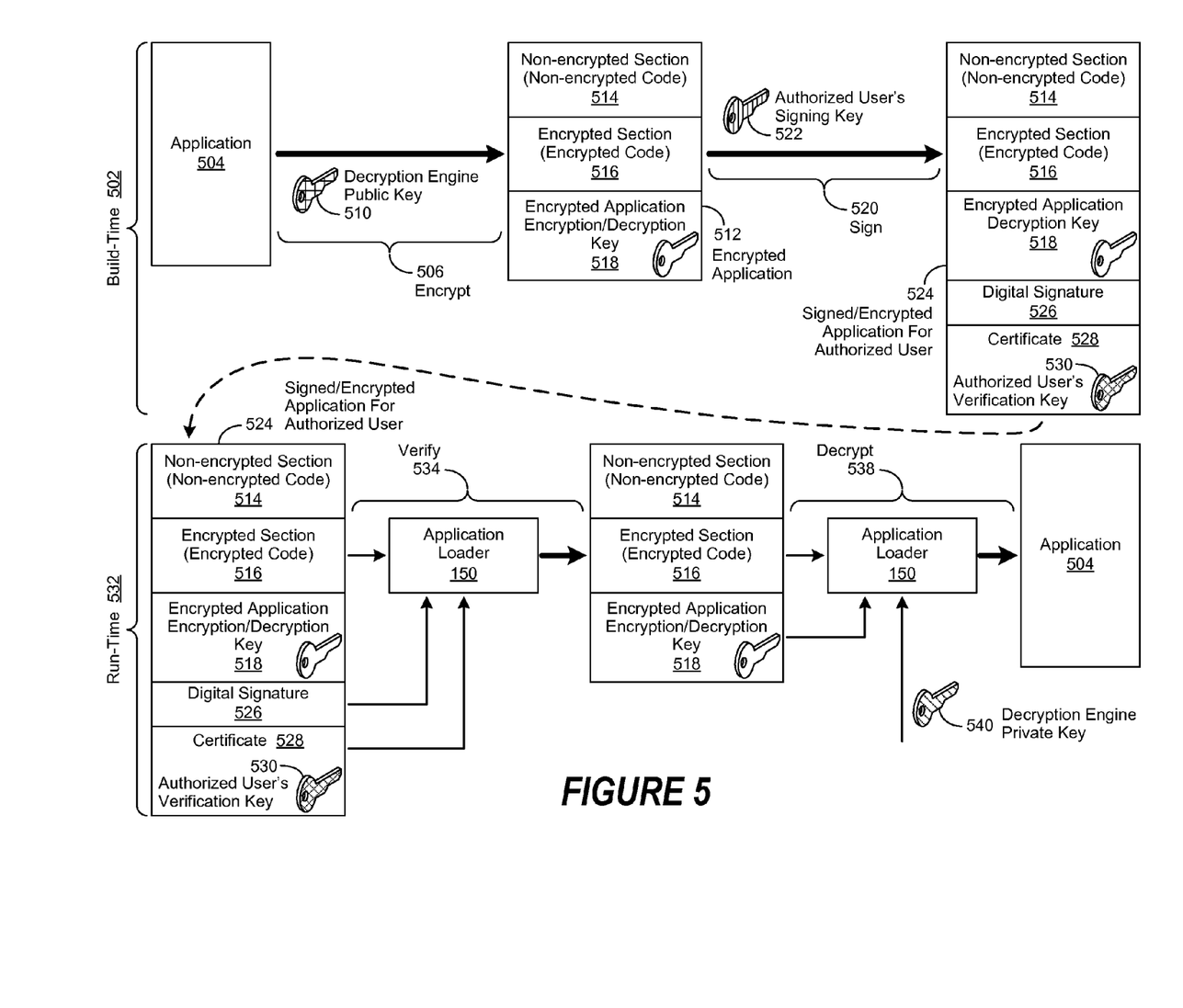
FIG. 5 is a simplified block diagram of verification and decryption operations performed with a private decryption key.

FIG. 5 is a simplified block diagram of verification and decryption operations performed with a private decryption key in accordance with an embodiment of the invention. In this embodiment, predetermined program code of application 504 is encrypted at build-time 502 with an application encryption/decryption key to generate encrypted section 516. In one embodiment, the application encryption/decryption key comprises a private key. The application encryption/decryption key is then encrypted with the public key 510 associated with a decryption engine to generate an encrypted application encryption/decryption key 518. The encrypted application encryption/decryption key 518 is then combined with the encrypted section 516 and the non-encrypted section 514, which comprises non-encrypted program code, to generate encrypted application 512. The encrypted application 512 is then digitally signed 520 with a signing key 522 of an authorized user to generate a signed/encrypted application 524 for the authorized user. The resulting signed/encrypted application 524 comprises the non-encrypted section 514, the encrypted section 516, the encrypted application encryption/decryption key 518, the previously generated digital signature 526, and a digital certificate 528 certifying the authenticity of the authorized user's public signature verification key 530.

At run-time 532, digital certificate 528 certifying the authenticity of the authorized user's public signature verification key 530 is verified 534 by the application loader 150. Thereafter, the verified digital certificate is used by the application loader 150 to verify 534 the authenticity of the signed/encrypted application 524. Once the signed/encrypted application 524 is verified, the application loader 150 uses the decryption engine private key 540 to decrypt 538 the encrypted application encryption/decryption key 518. Once the encrypted application encryption/decryption key 518 is decrypted, the resulting application encryption/decryption key is used by the application loader to decrypt 538 the encrypted program code contained in the encrypted section 516. The decrypted program code is then combined with the non-encrypted section 514 to generate application 504.

Figure 6:
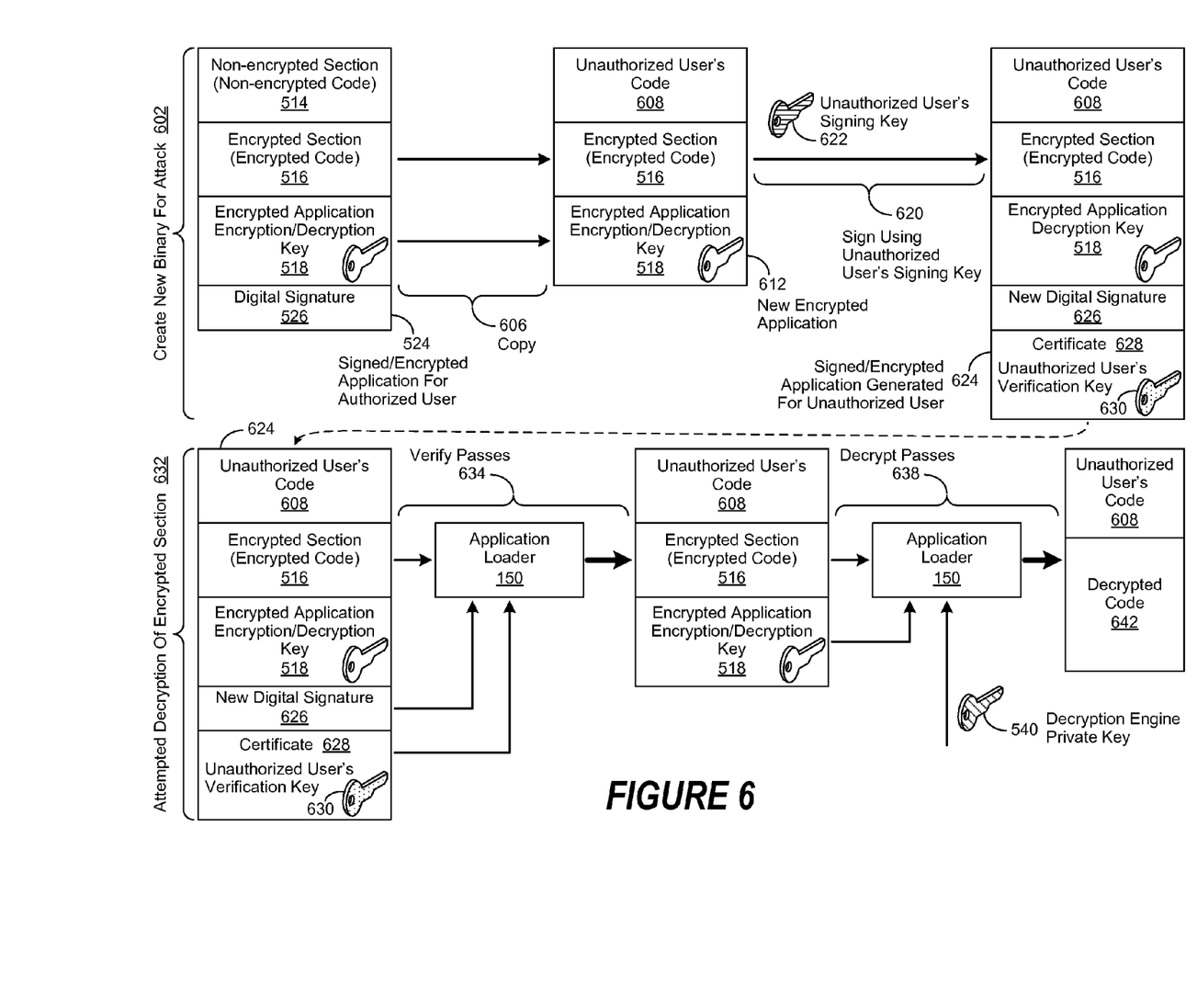
FIG. 6 is a simplified block diagram of a successful encrypted section replacement attack using an unauthorized user verification key.

FIG. 6 is a simplified block diagram of a successful encrypted section replacement attack using an unauthorized user verification key in accordance with an embodiment of the invention. In this embodiment, a malicious user creates a new binary for an encrypted section replacement attack 602. First, the encrypted section 516 and the encrypted application decryption/decryption key 518 is copied 606 to the new encrypted application 612, where it is then combined with unauthorized user code 608. The new encrypted application 612 is then digitally signed 620 with the unauthorized users signing key 622 to generate a new digital signature 626. A digital certificate 628 authenticating the unauthorized user's public signature verification key 630 is then combined with the new digital signature 626, the copied encrypted section 516, and the copied encrypted application decryption/decryption key 518 to generate a signed/encrypted application 624 for the unauthorized user.

An attempt 632 is then made to decrypt the encrypted section 516 of the signed/encrypted application 624 for the unauthorized user. First, the digital certificate 628 certifying the authenticity of the unauthorized user's public signature verification key 630 is verified 634 by the application loader 150. Assuming that the digital certificate is verified as being authentic, the verified digital certificate is then used by the application loader 150 to verify 634 the authenticity of the signed/encrypted application 524. Once the signed/encrypted application 624 for the unauthorized user is verified, the application loader 150 uses the decryption engine private key 540 to decrypt 538 the encrypted application encryption/decryption key 518. Once the encrypted application encryption/decryption key 518 is decrypted, the resulting application encryption/decryption key is used by the application loader to decrypt 638 the encrypted program code contained in the encrypted section 516. The decrypted program code 642 is then combined with the unauthorized user code 608. As a result, the malicious user has gained access to the encrypted program code contained in the encrypted section 516.

Figure 7:
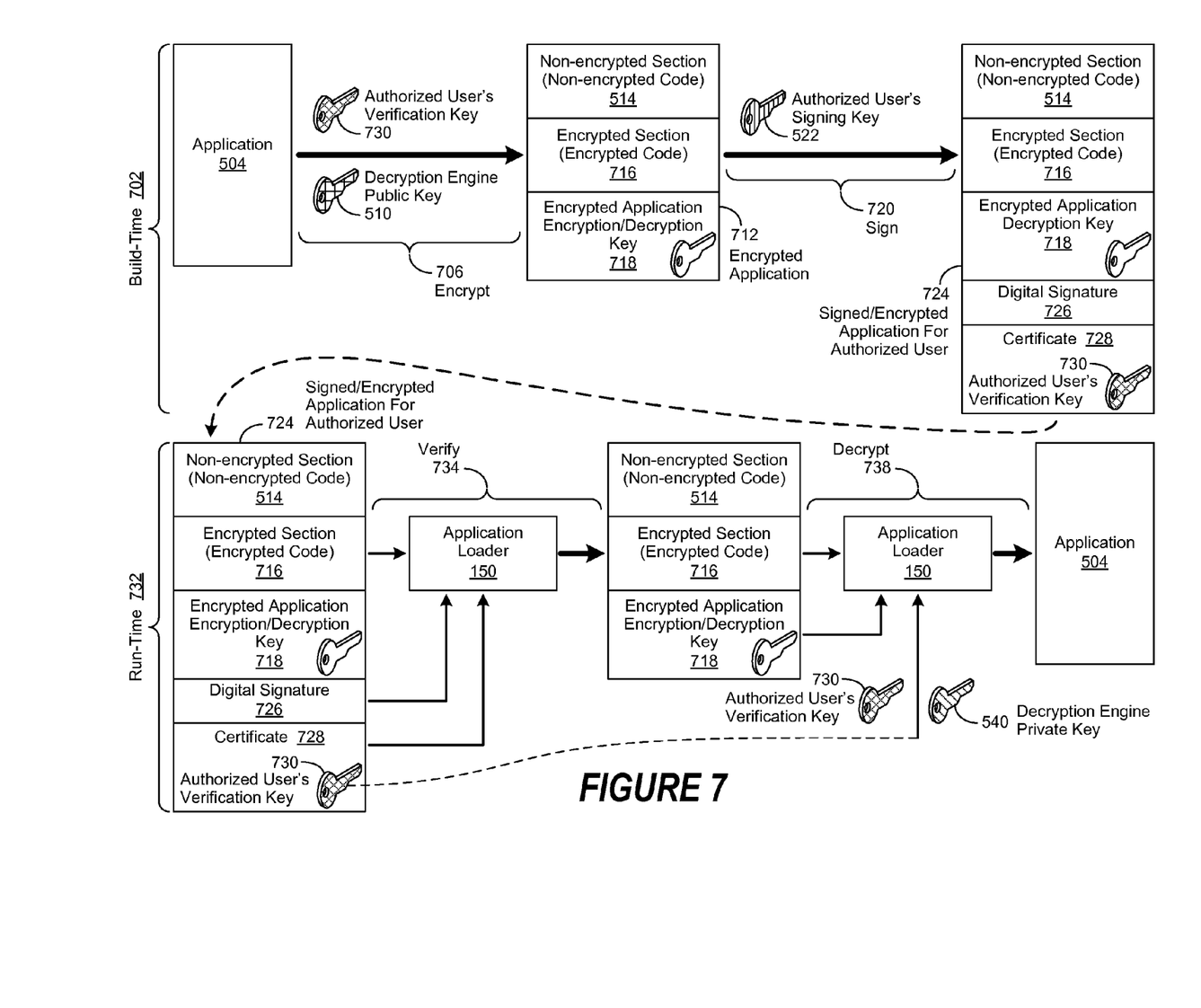
FIG. 7 is a simplified block diagram of verification and decryption operations performed with an authorized user verification key and a private decryption key.

FIG. 7 is a simplified block diagram of verification and decryption operations performed with an authorized user verification key and a private decryption key in accordance with an embodiment of the invention. In this embodiment, predetermined program code of application 504 is encrypted at build-time 702 with an application encryption/decryption key to generate encrypted section 716. In one embodiment, the application encryption/decryption key comprises a private key. The hash value of a digital certificate 728 certificate associated with the public signature verification key 730 of an authorized user is then calculated as described in detail herein. Binding operations are then performed with the application encryption/decryption key and the calculated hash value to generate a binding key as likewise described in detail herein.

The binding key is then encrypted 706 with the public signature verification key 510 of the application loader 150 to generate the encrypted application encryption/decryption key 718. In one embodiment, the application loader 150 comprises a trusted entity operable to perform verifying and decrypting operations. The encrypted application encryption/decryption key 718 is then embedded in the encrypted application 712 along with the non-encrypted section 514, which comprises non-encrypted program code, and the encrypted section 716, which comprises the previously encrypted program code. Once the encrypted application encryption/decryption key 718 is embedded, the encrypted application 712 is digitally signed 720 with the private signature key of an authorized user to generate a signed/encrypted application 724 for the authorized user. The resulting signed/encrypted application 724 comprises the non-encrypted section 514, the encrypted section 716, the encrypted application encryption/decryption key 718, the previously generated digital signature 526, and a digital certificate 528 certifying the authenticity of the authorized user's public signature verification key 530.

At run-time 732, digital certificate 528 certifying the authenticity of the authorized user's public signature verification key 530 is verified 734 by the application loader 150. Thereafter, the verified digital certificate 528 is used by the application loader 150 to verify 734 the authenticity of the signed/encrypted application 724 for the authorized user. Once the signed/encrypted application 724 is verified, the application loader 150 uses the verified digital certificate 728 to verify the authenticity of the signed/encrypted application 724 for the authorized user. The encrypted binding key is decrypted 738 with the private signature key 540 of the application loader 150. Then, the hash value of the digital certificate 728 associated with the public signature verification key 730 of the authorized user is calculated. The extracted binding key is then used with the calculated hash value of the digital certificate 728 to extract the application encryption/decryption key from the encrypted application encryption/decryption key 718. The encrypted section 716 is then decrypted 738 with the extracted application encryption/decryption key to generate application 504.

Figure 8:
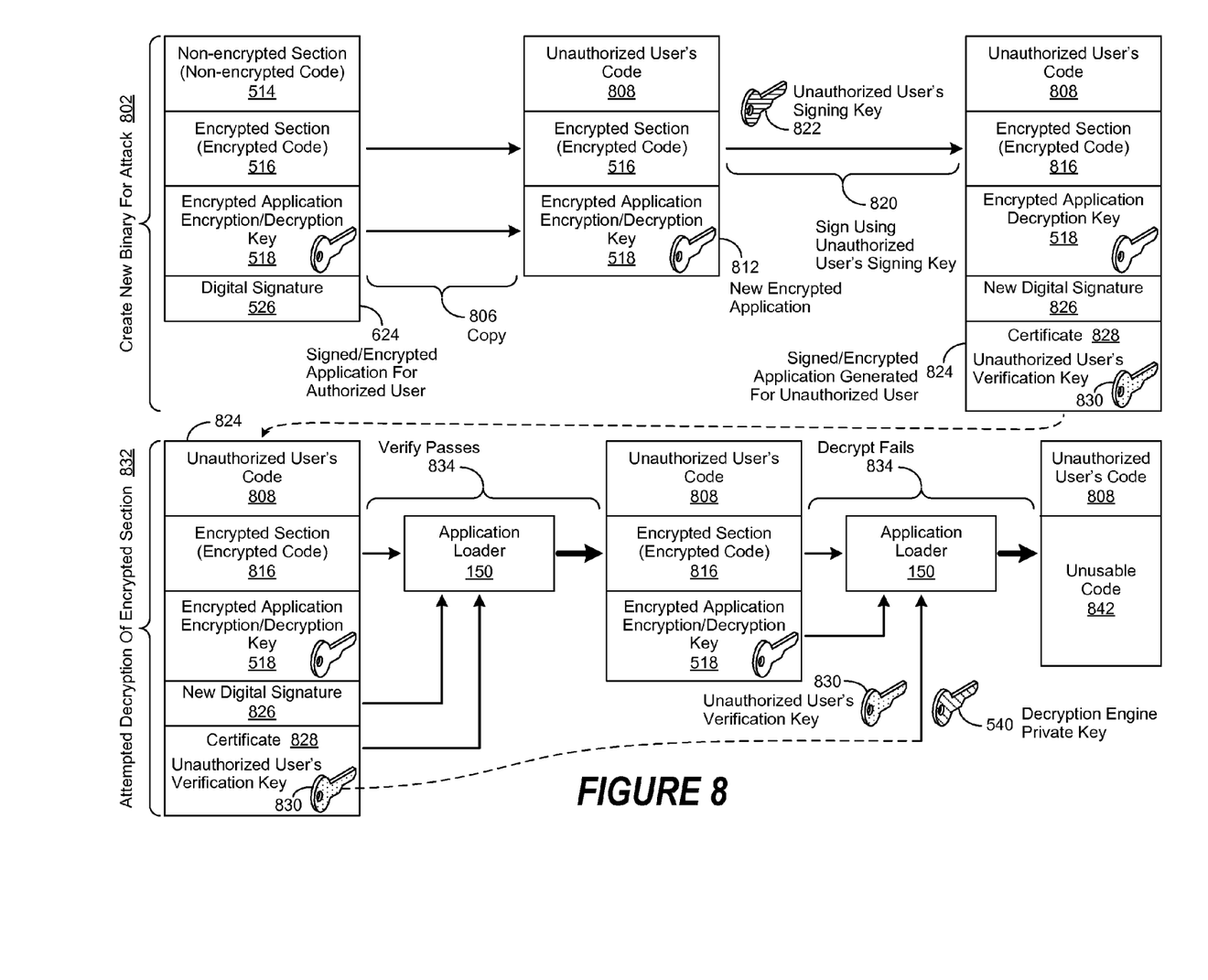
FIG. 8 is a simplified block diagram of an unsuccessful encrypted section replacement attack using an unauthorized user verification key.

FIG. 8 is a simplified block diagram of an unsuccessful encrypted section replacement attack using an unauthorized user verification key in accordance with an embodiment of the invention. In this embodiment, a malicious user creates a new binary for an encrypted section replacement attack 802. First, the encrypted section 516 and the encrypted application decryption/decryption key 518 is copied 806 to the new encrypted application 812, where it is then combined with unauthorized user code 808. The new encrypted application 812 is then digitally signed 820 with the unauthorized user's signing key 822 to generate a new digital signature 826. A digital certificate 828 authenticating the unauthorized user's public signature verification key 830 is then combined with the new digital signature key 826, the copied encrypted section 516, and the copied encrypted application decryption/decryption key 518 to generate a signed/encrypted application 824 for the unauthorized user.

An attempt 832 is then made to decrypt the encrypted section 516 of the signed/encrypted application 824 for the unauthorized user. First, the digital certificate 828 certifying the authenticity of the unauthorized user's public signature verification key 830 is verified 834 by the application loader 150. Assuming that the digital certificate is verified as being authentic, the verified digital certificate is then used by the application loader 150 to verify 834 the authenticity of the signed/encrypted application 824 for the unauthorized user. Once the signed/encrypted application 824 for the unauthorized user is verified, the application loader 150 uses the decryption engine private key 540 to decrypt 538 the encrypted binding key with its private signature key 540. Then, the hash value of the digital certificate 828 associated with the public signature verification key 830 of the unauthorized user is calculated. The application loader 150 then attempts to use the decrypted binding key and the calculated hash value of the digital certificate 828 to extract the application decryption/decryption key from the encrypted application decryption/decryption key 518. However, since the calculated hash value of the digital certificate 828 is not the same as the calculated hash value used to encrypt the application decryption/decryption key, the attempt to decrypt fails 834, resulting in the generation of unusable code 842.

Figure 9:
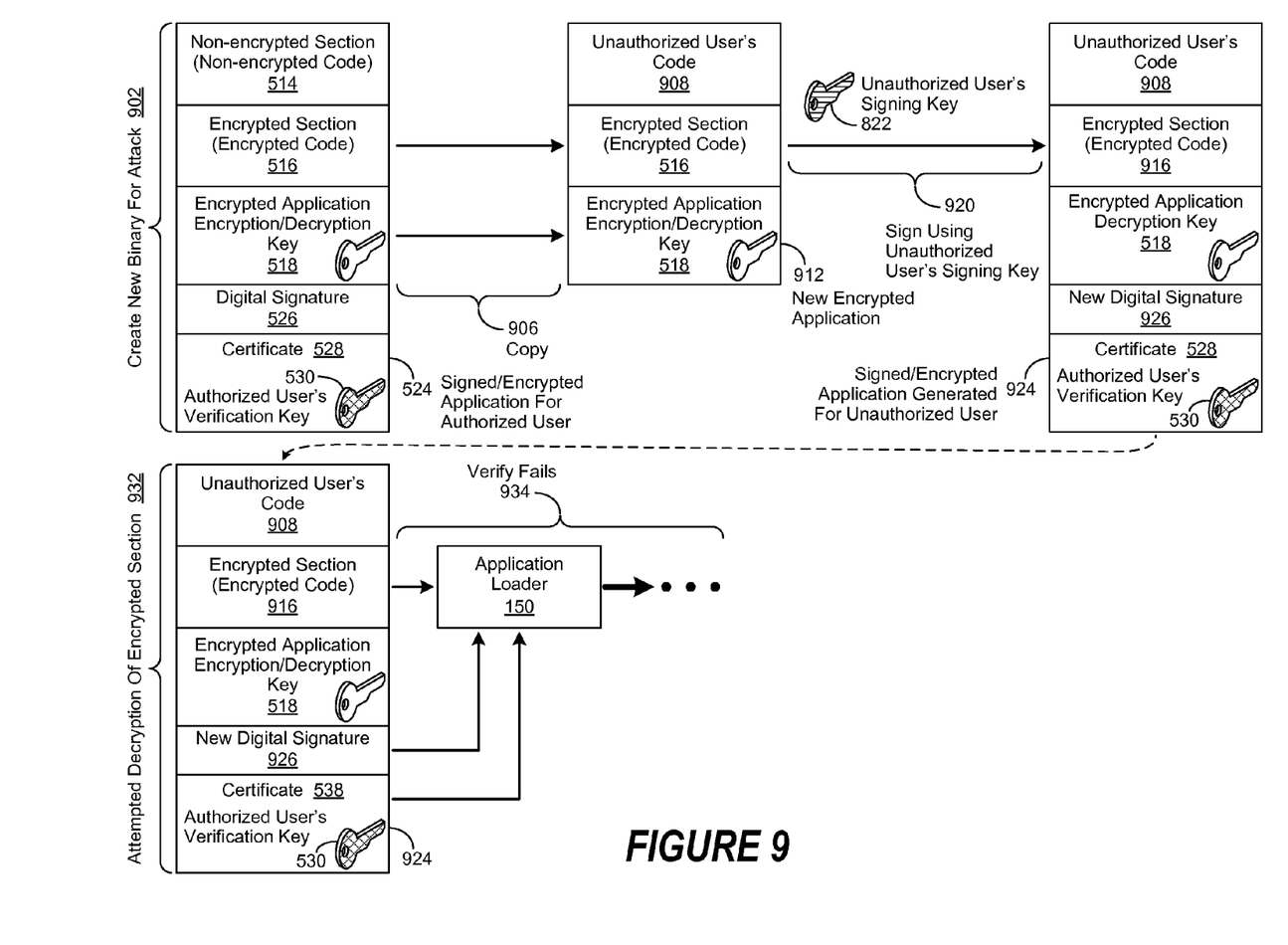
FIG. 9 is a simplified block diagram of an unsuccessful encrypted section replacement attack using an invalid digital signature.

FIG. 9 is a simplified block diagram of an unsuccessful encrypted section replacement attack using an invalid digital signature in accordance with an embodiment of the invention. In this embodiment, a malicious user creates a new binary for an encrypted section replacement attack 902. First, the encrypted section 516 and the encrypted application decryption/decryption key 518 is copied 906 to the new encrypted application 912, where it is then combined with unauthorized user code 908. The new encrypted application 912 is then digitally signed 920 with the unauthorized user's signing key 822 to generate a new digital signature 826. A digital certificate 528 authenticating an authorized user's public signature verification key 530 is then combined with the new digital signature key 926, the copied encrypted section 516, and the copied encrypted application decryption/decryption key 518 to generate a signed/encrypted application 924 for the unauthorized user.

An attempt 932 is then made to decrypt the encrypted section 516 of the signed/encrypted application 934 for the unauthorized user. First, the digital certificate 528 certifying the authenticity of the unauthorized user's public signature verification key 530 is verified by the application loader 150. Assuming that the digital certificate is verified as being authentic, the verified digital certificate 538 is then used by the application loader 150 to verify 934 the authenticity of the signed/encrypted application 924 for the unauthorized user. However, the verification fails 934 as the new digital signature 926 was generated by the unauthorized user's signing key 822 but the public signature verification key 530 is associated with an authorized user.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described to explain best the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for controlling access to program code, comprising:
    encrypting program code with a first key to generate encrypted program code;
    calculating the hash value of a digital certificate associated with a second key;
    binding the first key and the calculated hash value to generate a third key;
    encrypting the third key with a fourth key;
    embedding the encrypted third key in the program code to generate an encrypted program code image, the program code comprising the encrypted program code;
    signing the encrypted program code image with a fifth key to generate a signed and encrypted program code image;
    associating the digital certificate with the signed and encrypted program code image;
    verifying the digital certificate associated with the signed and encrypted program code image;
    verifying the signed and encrypted program code image with the verified digital certificate;
    decrypting the encrypted third key with a sixth key;
    calculating the hash value of the digital certificate;
    using the calculated hash value to extract the first key from the encrypted third key; and
    decrypting the encrypted program code with the extracted first key; and wherein
    the binding comprises performing a logical exclusive OR operation on the first key and the calculated hash value to generate the third key, the third key being a binding key; and,
    the using the calculated hash value to extract the first key from the encrypted third key comprises performing a logical exclusive OR operation on the calculated hash value and the encrypted third key;
    the first key comprises a private key;
    the second key comprises a public signature verification key of an asymmetrical public key pair;
    the fifth key comprises a private signature key of an asymmetrical public key pair;
    the asymmetrical public key pair is associated with an authorized user of the encrypted program code;
    the fourth key comprises a public signature verification key of an asymmetrical public key pair;
    the sixth key comprises a private signature key of an asymmetrical public key pair, and,
    the asymmetrical public key pair is associated with an application loader.

2. The method of claim 1, wherein the application loader comprises a trusted entity operable to perform the verifying and decrypting.

3. A system comprising:
    a processor;
    a data bus coupled to the processor; and
    a computer-usable medium embodying computer program code, the computer-usable medium being coupled to the data bus, the computer program code controlling access to program code and comprising instructions executable by the processor and configured for:
        encrypting program code with a first key to generate encrypted program code;
        calculating the hash value of a digital certificate associated with a second key;
        binding the first key and the calculated hash value to generate a third key;
        encrypting the third key with a fourth key;
        embedding the encrypted third key in the program code to generate an encrypted program code image, the program code comprising the encrypted program code;
        signing the encrypted program code image with a fifth key to generate a signed and encrypted program code image;
        associating the digital certificate with the signed and encrypted program code image;
        verifying the digital certificate associated with the signed and encrypted program code image;
        verifying the signed and encrypted program code image with the verified digital certificate;
        decrypting the encrypted third key with a sixth key;
        calculating the hash value of the digital certificate;
        using the calculated hash value to extract the first key from the encrypted third key; and
        decrypting the encrypted program code with the extracted first key; and wherein
        the binding comprises performing a logical exclusive OR operation on the first key and the calculated hash value to generate the third key, the third key being a binding key; and,
        the using the calculated hash value to extract the first key from the encrypted third key comprises performing a logical exclusive OR operation on the calculated hash value and the encrypted third key;
        the first key comprises a private key;
        the second key comprises a public signature verification key of an asymmetrical public key pair;
        the fifth key comprises a private signature key of an asymmetrical public key pair;
        the asymmetrical public key pair is associated with an authorized user of the encrypted program code;
        the fourth key comprises a public signature verification key of an asymmetrical public key pair;
        the sixth key comprises a private signature key of an asymmetrical public key pair, and,
        the asymmetrical public key pair is associated with an application loader.

4. The system of claim 3, wherein the application loader comprises a trusted entity operable to perform the verifying and decrypting.

5. A non-transitory computer-usable medium embodying computer program code, the computer program code comprising computer executable instructions configured for:
    encrypting program code with a first key to generate encrypted program code;
    calculating the hash value of a digital certificate associated with a second key;
    binding the first key and the calculated hash value to generate a third key;
    encrypting the third key with a fourth key;
    embedding the encrypted third key in the program code to generate an encrypted program code image, the program code comprising the encrypted program code;
    signing the encrypted program code image with a fifth key to generate a signed and encrypted program code image;
    associating the digital certificate with the signed and encrypted program code image;

verifying the digital certificate associated with the signed and encrypted program code image;
verifying the signed and encrypted program code image with the verified digital certificate;
decrypting the encrypted third key with a sixth key;
calculating the hash value of the digital certificate; and,
using the calculated hash value to extract the first key from the encrypted third key;
decrypting the encrypted program code with the extracted first key; and wherein the binding comprises performing a logical exclusive OR operation on the first key and the calculated hash value to generate the third key, the third key being a binding key; and,
the using the calculated hash value to extract the first key from the encrypted third key comprises performing a logical exclusive OR operation on the calculated hash value and the encrypted third key;
the first key comprises a private key;
the second key comprises a public signature verification key of an asymmetrical public key pair;
the fifth key comprises a private signature key of an asymmetrical public key pair;
the asymmetrical public key pair is associated with an authorized user of the encrypted program code;
the fourth key comprises a public signature verification key of an asymmetrical public key pair;
the sixth key comprises a private signature key of an asymmetrical public key pair, and,
the asymmetrical public key pair is associated with an application loader.

6. The computer usable medium of claim 5, wherein the application loader comprises a trusted entity operable to perform the verifying and decrypting.

7. The computer usable medium of claim 5, wherein the computer executable instructions are deployable to a client computer from a server at a remote location.

8. The computer usable medium of claim 5, wherein the computer executable instructions are provided by a service provider to a customer on an on-demand basis.

* * * * *